H. DREWELL.
MACHINE FOR PERFORATING THE OPERATING BANDS OF TYPE SETTING MACHINES.
APPLICATION FILED MAR. 9, 1911.

1,001,825.

Patented Aug. 29, 1911.

WITNESSES:
John C. Sanders
John A. Percival

INVENTOR
Heinrich Drewell
BY 
ATT'Y

H. DREWELL.
MACHINE FOR PERFORATING THE OPERATING BANDS OF TYPE SETTING MACHINES.
APPLICATION FILED MAR. 9, 1911.

1,001,825.

Patented Aug. 29, 1911.

WITNESSES:
John C. Sanders
John A. Percival.

INVENTOR
Heinrich Drewell
BY
ATT'Y.

H. DREWELL.
MACHINE FOR PERFORATING THE OPERATING BANDS OF TYPE SETTING MACHINES.
APPLICATION FILED MAR. 9, 1911.

1,001,825.

Patented Aug. 29, 1911.

WITNESSES:
John C. Sanders
John A. Percival

INVENTOR
Heinrich Drewell
BY
ATT'Y.

H. DREWELL.
MACHINE FOR PERFORATING THE OPERATING BANDS OF TYPE SETTING MACHINES.
APPLICATION FILED MAR. 9, 1911.

1,001,825.

Patented Aug. 29, 1911.

H. DREWELL.
MACHINE FOR PERFORATING THE OPERATING BANDS OF TYPE SETTING MACHINES.
APPLICATION FILED MAR. 9, 1911.

1,001,825.

Patented Aug. 29, 1911.

WITNESSES:
John C. Sanders
John A. Percival.

INVENTOR
Heinrich Drewell
BY
ATTY.

H. DREWELL.
MACHINE FOR PERFORATING THE OPERATING BANDS OF TYPE SETTING MACHINES.
APPLICATION FILED MAR. 9, 1911.

1,001,825.

Patented Aug. 29, 1911.

UNITED STATES PATENT OFFICE.

HEINRICH DREWELL, OF CHARLOTTENBURG, GERMANY, ASSIGNOR TO SCHNELLSETZ-MASCHINENGESELLSCHAFT MIT BESCHRÄNKTER HAFTUNG, OF CHARLOTTENBURG, GERMANY.

MACHINE FOR PERFORATING THE OPERATING-BANDS OF TYPE-SETTING MACHINES.

1,001,825. Specification of Letters Patent. Patented Aug. 29, 1911.

Application filed March 9, 1911. Serial No. 613,226.

*To all whom it may concern:*

Be it known that I, HEINRICH DREWELL, a subject of the German Emperor, residing at Charlottenburg, Germany, have invented new and useful Improvements in Machines for Perforating the Operating-Bands of Type-Setting Machines, of which the following is a specification.

My present invention relates to means for perforating the operating bands of automatic type-setting machines, and an important object is to provide an automatic justifying device in combination with a band-perforating machine such as is described, for example, in my U. S. Letters Patent 988,984, dated April 11, 1911.

Perforated bands, which are used for operating type or matrix setting machines, are made in known manner by means of perforating machines, in which the depression of keys causes corresponding symbols to be punched in the band. These symbols not only cause types or matrices to be set up, but also control all the other functions which the perforated band has to perform in the automatic type-setting machine. The operator at the perforating machine can therefore initiate all the operations necessary for making matter by means of the perforated band, such as, for example, the division and justification of the lines, setting up space-bars or justifying members, the cancellation of lines, words, and the like. The lines are terminated by pressing a line-separating key, or in like manner, while observing a suitable device which indicates the lengths of the line. The spaces between words are represented on the register band by striking a special word-separating key. When terminating a line its justification must simultaneously be taken into consideration. The manner of justification depends upon the type-setting machine which is to be operated by the perforated band. Either a single-type setting machine, or a type-casting and composing machine, or a matrix-setting and line-casting machine may be employed. In the present case the following supposition as to justification is made, which however is only one example of a constructional form. Justification is effected by automatically enlarging the breadth of the elements or members separating words in the type-setting machine, without the cooperation of the composer or of the perforated band. For enlarging these elements or members an upper limit is given, beyond which they cannot be enlarged. But in order to obtain greater spaces between words than are given in this manner, the composer can cause a second member to be set up in addition to the standard member separating words, the breadth of the same being added to that of the preceding element. The breadth of this additional member does not require to be variable. In the following specification I shall designate the ordinary justification element as the justification blank and the additional element as the auxiliary blank. Whether it is necessary in a given line to add such auxiliary blanks to the standard justification blanks between the words can be known by the composer, after he has written and perforated the line on the register band, only by observing an indicating device. Then, by pressing a special key, he can perforate in the register band a symbol which, when the band is operating the type-setting machine for the whole line behind which the symbol is situated, causes an auxiliary blank to be added to the justification blank between two words. When operating a single type composing or type-casting and composing machine compressible spaces of any suitable construction may be employed as justification blanks. When a matrix-setting and line-casting machine is controlled by the band, the well-known wedge-shaped justifiers may be employed. When observing the indicating device the length of the line and the number of words in the same have to be considered and it is necessary to strike at least two keys for completing the line. As this method of working requires too much time and often leads to errors I prefer to employ an automatic device for selecting the auxiliary blanks if such are necessary.

Therefore the principal object of this invention is, on the one hand, to avoid observing the indicating device and striking more than one key when terminating a line and, on the other hand, automatically to cause the perforation of a symbol in the band which, when the band is operating the type-setting machine, will, if necessary, bring about the addition of an auxiliary blank to each of the justification blanks. Moreover, I have found it practicable to employ two or more auxiliary blanks of different widths, thus making it possible to enlarge the width of a word-separating space to any extent. But in this case it is to be noted that the width of the smallest auxiliary blank is somewhat smaller than the amount by which the width of an ordinary justification blank may be enlarged or diminished without the addition of an auxiliary blank, and the width of the other auxiliary blank must be in a determined and simple proportion to the width of the smallest auxiliary blank.

In the illustrative embodiment of my invention it is assumed that the register bands made by means of this mechanism are employed for a matrix-setting and line-casting machine arranged to be operated by means of a register band. In these machines the lines of matrices are justified by wedge-shaped justifiers of variable breadth, but in many instances auxiliary blanks have to be added to the wedge-shaped justifiers in order to make it possible to justify the lines to the given standard length. If the line-casting machine is operated by hand, the auxiliary blanks are added after the line has been set up, because only then can it be known whether any, and if so which, auxiliary blanks are necessary. When working by means of a register band, however, that length of line must be at once set up in the type-setting machine which is necessary in order by lengthening it by means of the wedge-shaped justifiers to obtain the standard length of line. According to my present invention, when making the register band the length of line is determined by the feed of the paper carriage of the typewriter connected with the perforating apparatus, as described in my United States Letters Patent 851,504, the individual elements of matter being registered with a width which is proportional to the width of the printed characters in the matter to be set up. This registering can also be brought about by a type-space indicator of any other suitable construction. The constructional form of the feed mechanism used for this is not material for the present invention.

In order distinctly to mark the spaces between words in the typewritten text, in the device hereinafter described the paper carriage is fed the greatest distance which can be obtained in the type-setting machine by completely enlarging the wedge-shaped justifiers and adding the greatest width of the auxiliary blanks which is used. Therefore, in the copy of the text which is to be set up produced simultaneously when perforating the register band, each line in which wedge-shaped justifiers are employed appears in such length as the correspondently composed line of matrices would have if the wedge-shaped justifiers were enlarged to their greatest width and one of the largest auxiliary blanks to each of them had been added. Consequently the length of each line, in which no wedge-shaped justifiers are set up, in the perforating machine must be proportional to the standard length of line in the type-setting machine, that is to say the minimum length of line indicated in the perforating machine agrees with the standard length of line in the type-setting machine. Further, each line in which there are wedge-shaped justifiers may be overfilled in the perforating machine an amount exceeding the minimum length of line, by which it can be shortened, by reducing the total width of justification of the wedge-shaped justifiers and auxiliary blanks which are employed. The reduction of the length can be brought about, on the one hand, by inserting smaller auxiliary blanks or entirely omitting the same, and, on the other hand, by not enlarging the wedge-shaped justifiers to their full width. How large the width of justification of a line is and how much it can be extended beyond the minimum length can, however, only be known when the line has been set approximately full. It is therefore also possible to determine, only after completing a line, whether auxiliary blanks must be added to the wedge-shaped justifiers and what width is to be selected. In general, the composer will place as many characters as possible into the line and then pay his attention to justifying the line by means of the wedge-shaped justifiers in it without using auxiliary blanks. But if a long word or a long syllable is to be placed at the end of the line, particularly in short lines having but few wedge-shaped justifiers, the employment of auxiliary blanks frequently cannot be avoided. Now by means of the device described hereinafter it is to be determined, independently of the attention of the composer, not only whether an auxiliary blank must be added to each wedge-shaped justifier, but simultaneously which perforated symbol must be punched to select in the type-setting machine the auxiliary blank requisite for complete justification. In this mode of justifying by means of expansible wedge-shaped justifiers and adding auxiliary blanks to each wedge-shaped justifier, the auxiliary blanks operate in such manner that they increase the width of a wedge-shaped justifier by the amount of their width, it being unnecessary for the auxiliary blanks to be of variable width. Also, it is not necessary to distribute among the word-separating spaces fractions of units which may occur owing to the various numbers of words in the line, because such fractions are equalized by the constantly variable wedge-shaped justifiers. Consequently, the operation of the mechanism described hereinafter is independent both of the length of line and of the number of words in a line.

According to the present invention, whenever the word-separating key is struck a symbol for a wedge-shaped justifier is perforated, and the paper carriage is simultaneously fed in the manner described above. Simultaneously, two stop-rails are shifted in such manner by means of one simple ratchet wheel that their displacements are proportional to the widths of two kinds of auxiliary blanks provided in the type-setting machine. After the line has been set up approximately full, by depressing the line-separating key or a special justification key an angle lever is so controlled through the medium of the displaceable stop-rails that it coacts with a corresponding justification bar operating the perforating apparatus and thereby causes the combination of holes for the auxiliary blank requisite for the time being to be punched. If the set line can be increased without auxiliary blanks to the prescribed standard length, the perforated symbol for the auxiliary blank is omitted and only the symbol for separating the lines is punched.

One illustrative embodiment of my invention is represented by way of example in the accompanying drawings, wherein:—

Fig. 12 shows a top plan view of the stop rails, racks and gears of the justifier selecting mechanism. The Figs. 1, 2, 5 and 10 substantially agree with the corresponding figures of my beforementioned U. S. Letters Patent 988,984, dated April 11, 1911. The same reference characters used in that U. S. Letters Patent are here employed for corresponding parts in the present application in so far as these parts are of importance in describing the present invention.

Figure 1:
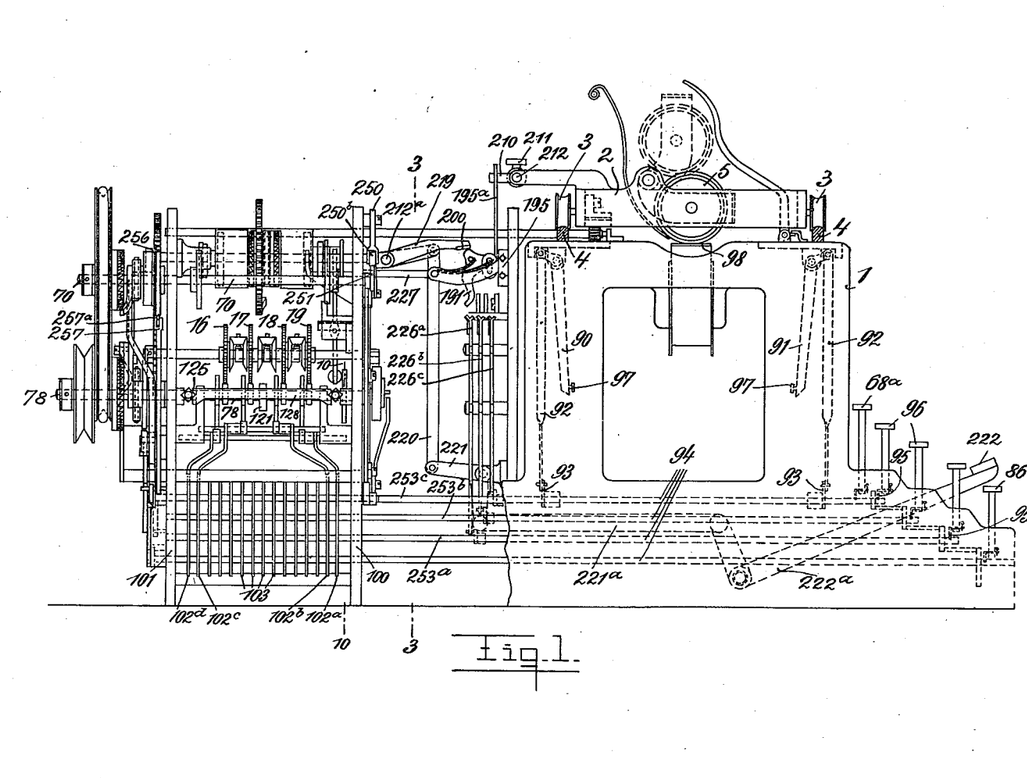
Figure 1 is a side elevation showing the entire perforating machine, Fig. 2 a like view, enlarged, showing the rear part of the same.
Figure 10:
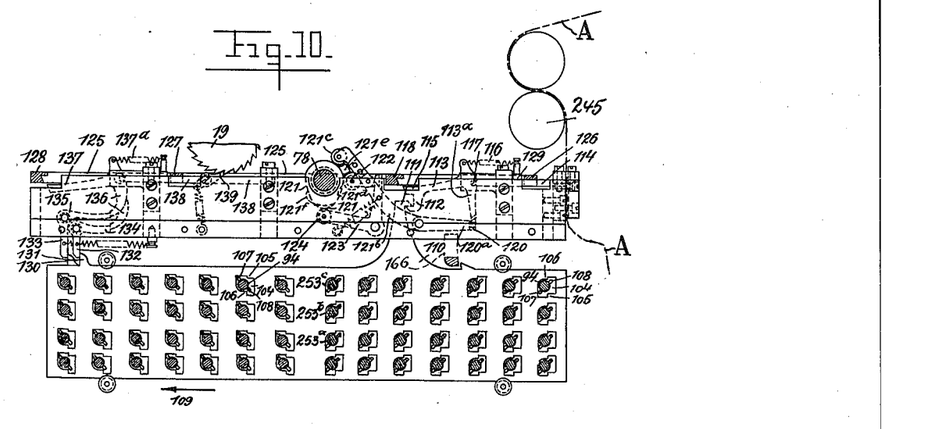
Fig. 10 is a vertical section taken on the line 10—10 in Fig. 1 showing the band perforating device.

Referring to the drawings and firstly to Figs. 1 and 10, the type levers 90 and 91 are mounted in suitable manner in the body or frame 1 of the typewriter and connected by draw rods 92 with levers 93. These are arranged on shafts 94 which, on the one hand, carry at one end levers 95 and are so connected by these with the keys 96 that, when a key is depressed, one of the shafts 94 is rotated, and the levers 93 act by means of the draw rods 92 on the type levers 90 so that the type 97 corresponding to the key which has been depressed strikes against the platen roll, whereby an impression of the type is obtained by means of the ribbon 98 located between the type and the platen roll. On the other hand, the shafts 94 are carried at their other end in the frame of the perforating apparatus and are journaled therein at 100 and 101. They traverse four plates 102$^a$, 102$^b$ and 102$^c$, 102$^d$, as well as eleven plates 103 which will hereinafter be termed universal bars. The universal bars 102$^a$ to 102$^d$ influence the feed mechanism of the paper carriage, while the universal bars 103 effect the selection of the punches. When any key is depressed the corresponding shaft 94 is rotated and plates 103 or 102$^a$ to 102$^d$ are displaced. This displacement is brought about as follows:—In each of the universal bars 102$^a$ to 102$^d$ and 103 is provided for each shaft a recess 104 and within each recess two teeth or shoulders 105 and 106 (Fig. 10). On the periphery of each shaft 94 are ribs or projections 107 and 108 arranged diametrally opposite one another. But the projections 107 and 108 are so displaced longitudinally of the shaft relatively to one another that a gap on the one side always corresponds to a rib on the other side. The shafts 94 are divided into two groups as seen in section in Fig. 10. Those located to the left in Fig. 10 are rotated clockwise when a key is depressed, whereas those on the right are rotated counterclockwise when a key is depressed. But the universal bars 102$^a$ to 102$^d$ and 103 are always displaced in the same direction, namely in that shown by the arrow 109 in Fig. 10. The shoulders 105 and 106 in the recesses of the universal bars and the projections 107 and 108 on the shafts 94 are positioned correspondingly. When a shaft on the left of Fig. 10 rotates, the bottom projection 108 of this shaft coacts with the shoulder 106 opposite to it and moves the universal bar, in which the shoulder is located, from the right to the left. During this rotation the projections 107 in those plates which are not to be displaced are placed in front of the shoulders 105 and prevent the universal bars in question being moved. It is obvious from this that the two projections 107 and 108 need never be in one and the same recess, but that, on the contrary, only one of the projections 108 may be at any time in the recess of each universal bar. On the right-hand side the corresponding projection and shoulder are located reversely, i. e. the projection 108 is above, and the projection 107 and shoulder 105 are below, the shaft 94.

Each of the universal bars 103 has an extension 110 running out into a hook 111. The latter engages in a hook 112 of an angle lever 113 which is mounted to rock at the end of the punch 114 and has three arms, of which the arm 113 has, besides the hook 112, an extension 115. When the hook 111 releases the hook 112, which occurs in consequence of the universal bar 103 in question being moved owing to a key being struck, the angle lever 113 rocks under the action of the spring 116 about the round head 117 of the punch 114, and the extension or shoulder 115 arrives in front of the striking bar 118. Whenever a key is struck two of the universal bars 103 are moved, and each of these bars corresponds to a special punch which is rendered operative in the described manner by the displacement of the universal bars owing to the extension 115 corresponding to the punch in question arriving in front of the striking bar 118, and when the key moves farther a special coupling device is released, whereby the main shaft 78 of the perforating apparatus is operated. At this shaft is a cam 121 which, when the main shaft rotates, impels the bar 118 forward by means of the roller 122. This forward movement takes place during the third quarter of a revolution of the main shaft 78 and has terminated at the commencement of the fourth quarter. At this moment the withdrawal of the bar 118 begins by means of the angle lever 123 and the roller 124, on which the cam 121 acts, when the striking bar is retracted. The striking bar 118 is mounted in a frame 125, in which are arranged, in addition, two cross-bars 126 and 127 and an additional striking bar 128. When the frame 125 returns, the bar 128 engages behind a shoulder 129 of the punch 114 and returns the punches into their normal position in so far as they had been pushed forward by the bar 118. In order that the hooks 112 may be placed under the hooks 111 a bar 120 is provided secured by a lever-arm 120$^a$ to an axle 121$^a$ which carries another lever-arm 121$^b$, at whose end is arranged a roller 121$^c$. This runs on a cam 121$^d$ fast on the main shaft 78. The cam has two projections 121$^e$ and 121$^f$. During the return motion of the punches the roller 121$^c$ runs on the dwell of the cam 121$^d$. The bar 120 is located in the path of the arms 113$^a$ of the angle levers 113. The point of each of these arms is stopped by the bar 120, the angle lever 113 moving so far that the hook 112 engages under the hook 111. When the punch has returned so far that this engagement has taken place, the extension 121$^e$ lifts the roller 121$^c$ and thereby moves the bar 120 downwardly so that it releases the lever arms 113$^a$. Consequently, the spring 116 pulls the angle lever 113 around so far that the hook 112 lies against the hook 111, whereby further rotation of the angle lever 113 is temporarily prevented. In order that the point of the lever 113$^a$ can slide unimpededly over the bar 120 when the punches are driven forward, at the moment when the punches are driven forward the bar 120 is moved downwardly by the projection 121 of the cam 121$^b$ so that it does not contact with the point of the levers 113$^a$.

The universal bars 102 to 102$^d$ have extensions 130 and 131 which coact with the vertical arms 132 and 133 of angle levers. The horizontal arms 134, 135 of these angle levers form catches or pawls, by which the angle levers 136 are held in their normal position. The angle levers 136 are pivoted to rods 138 in like manner as the angle levers 113 and possess a horizontal arm 137 which can be placed in the path of the striking bar 128. This is brought about by the spring 137$^a$ as soon as the arms 136 are unlocked by the angle levers 135, 134. Four rods 138 are provided corresponding to the four universal bars 102$^a$ to 102$^d$. Each of these bars coacts with an angle lever 132, 134 or 133, 135 and correspondingly, each bar 102$^a$, 102$^d$, 102$^c$, 102$^d$ occasions, when displaced, the movement of one of these angle levers and the interpolation of an intermediate lever 137 in front of the striking bar 128. Now if the latter together with the frame 125 is pushed forward when the main shaft 78 rotates once, those rods 138, whose levers 137 have been thrown into gear owing to the universal bars 102$^a$ to 102$^d$ in question having been pushed forward, are driven in the direction of motion of the frame. Pawls 139 are provided on the rods 138 and engage in the ratchet wheels 16, 17, 18, 19 of the feed mechanism. When one rod 138 is moved forward the corresponding pawl 139 rotates the appertaining wheel 16, 17, 18, 19. These wheels are prevented from moving backward by suitable spring-pressed pawls not shown in the drawings. The number of teeth of the ratchet wheels 16, 17, 18, 19 is various and, correspondingly, the feed of the paper carriage which they occasion is various. The motions of the individual wheels 16 to 18 is added by means of differential gear and imparted to the paper carriage. The mode of operation of the differential gear has been described in detail in my United States Patent No. 953,988 dated April 5, 1910.

The frame 2 of the paper carriage runs with rollers 3 on rails 4 secured on the body 1 of the type-writer (Fig. 1). The platen roll 5 is mounted in known manner in the paper carriage 2. The devices for securing the paper on the platen roll, for raising the platen roll and for rotating the same are not shown because they may be constructed in any desired manner and are sufficiently well-known. Their mode of operation is not relevant to the present invention. In contradistinction to the ordinary arrangement, a spring tends to bring the paper carriage constantly into the position which the carriage occupies when beginning a line. When writing, the paper carriage is fed by feed mechanism which works against the spring and is driven by the mechanical force serving for perforating the paper band. This arrangement makes it possible for the paper carriage to move backward automatically, after definite keys have been struck, namely after the depression of the line-separating key, the line-canceling key or the word-canceling key. The mechanism serving for feeding the paper carriage and for placing it into its position for beginning a line are described and shown in my before-mentioned U. S. Letters Patent 988,984, dated April 11, 1911.

Figure 2:
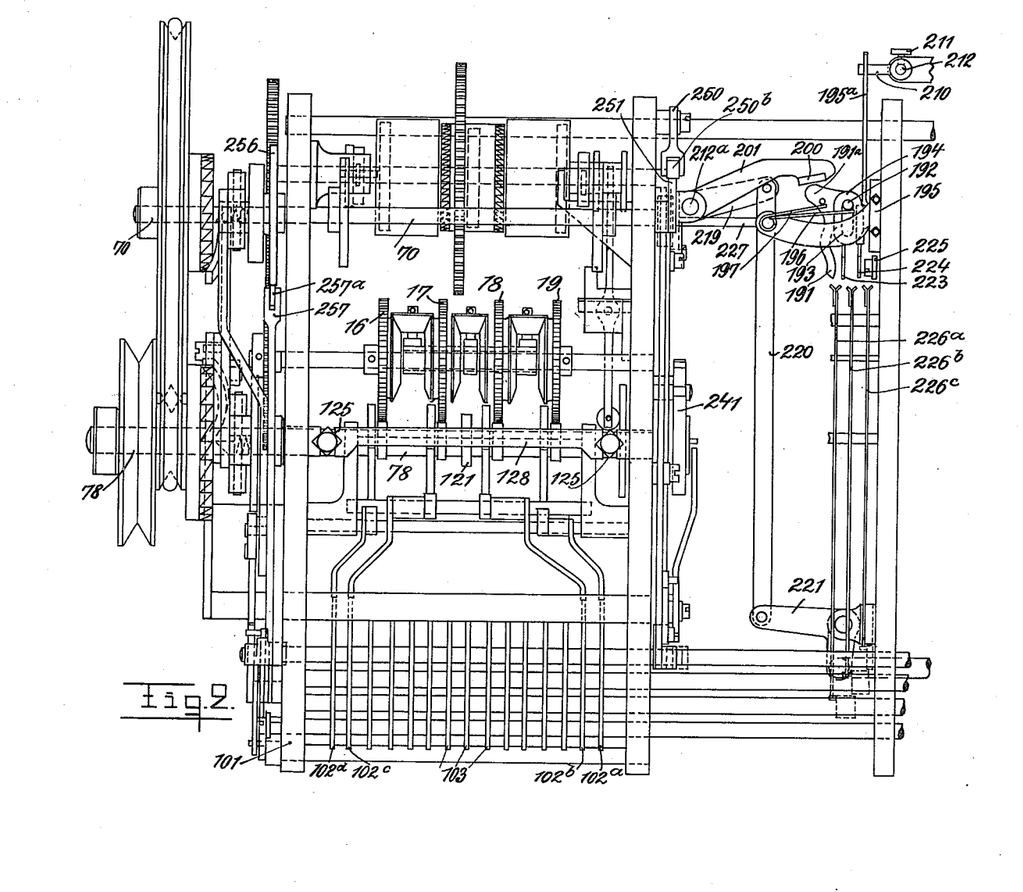
Figure 8:
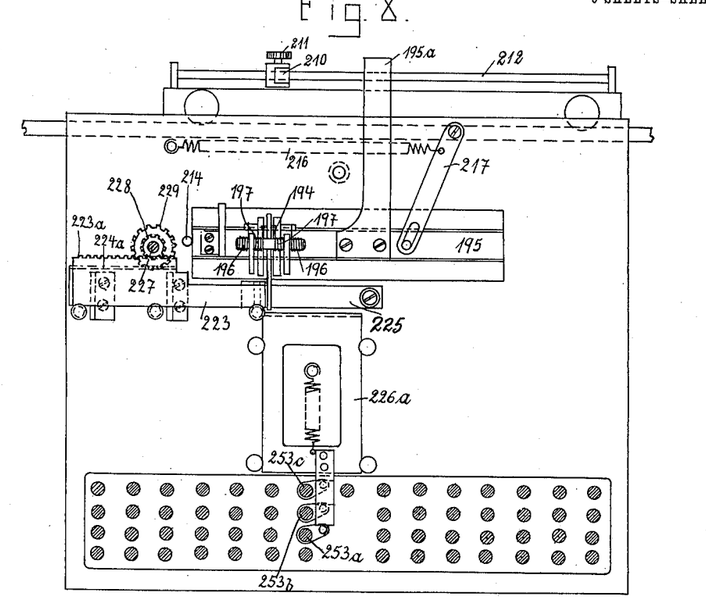
Fig. 8 is a vertical section taken on the line 3—3 in Fig. 1, but as seen from the rear of the machine, showing the justifier selecting mechanism.
Figure 9:
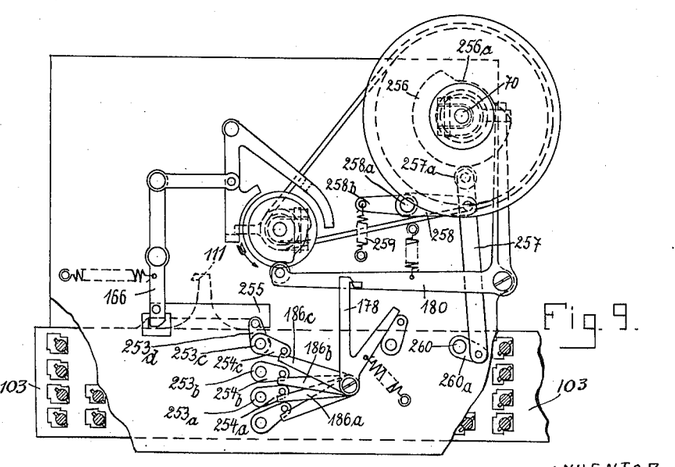
Fig. 9 is an elevation of the driving device.

Referring now to Figs. 1, 2 and 8, a rod 212 carrying an adjustable stop 210 fixable by means of the screw 211 is mounted on the paper carriage 2. As soon as the paper carriage travels beyond the minimum length of line the stop 210 shifts a slide 195 by means of the arm 195$^a$ on the latter. This slide is mounted readily movable in the main frame of the perforating machine and is held by means of the spring 216 (Fig. 8) and the lever 217 in its normal position against the fixed pin 214, and after passing beyond the minimum length abuts against the stop 210 of the paper carriage. On the slide 195 is a bracket 194 provided with slots 193 (Fig. 2); an axle 192, about which the angle lever 191, 191$^a$ can rock against the action of the spring 197, is vertically displaceable in these slots against the action of the springs 196. Consequently, the angle lever 191, 191$^a$ is adjustable in a threefold manner, firstly in the direction of the movement of the paper carriage, secondly in the direction of rotation about the axle 192, and, thirdly, in the direction of the slot 193. This latter movement can, however, only take place when the arm 191 of the angle lever is resting against one of the stop-rails 223, 224 and 225, because the springs 196 are considerably stronger than the springs 197. The rotation of the angle lever 191 and its vertical displacement in the slots 193 is brought about by a plate 200 secured by means of the lever arms 201 on the axle 212$^a$ which also carries a lever arm 219 connected by the tie rod 220 with the angle lever 221. The line-separating key 222 is connected by the rod 221$^a$ and the angle lever 222$^a$ with this angle lever 221. I may, however, provide a special key for actuating the described mechanism without departing from the scope of my invention.

Figure 3:
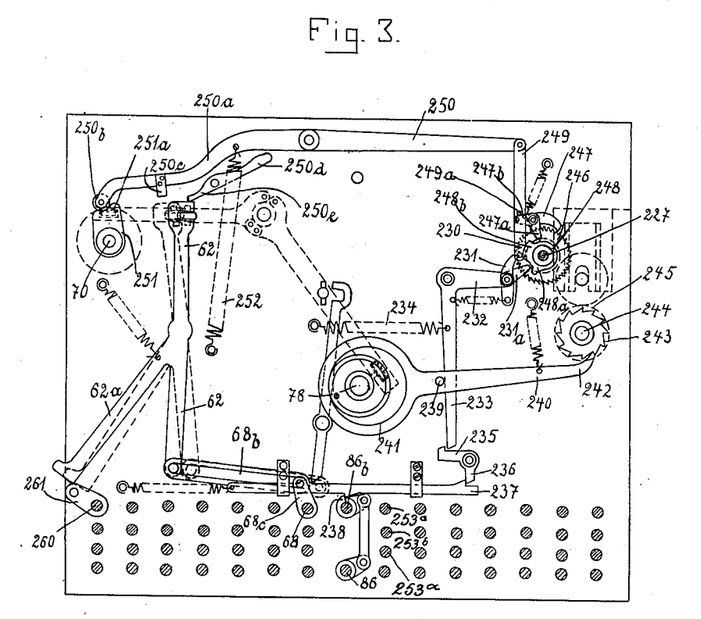
Fig. 3 is a vertical section taken on the line 3—3 in Fig. 1 as seen from the front of the machine.
Figure 4:
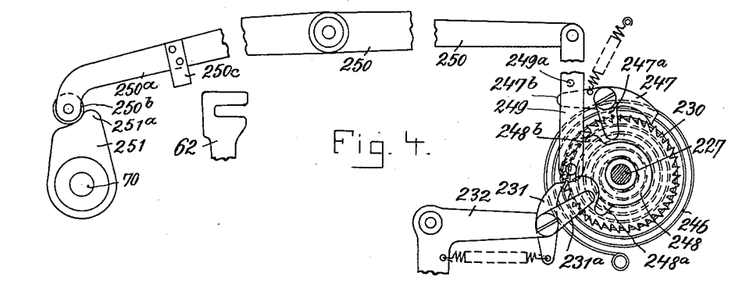
Figs. 4, 5, 6 and 7 show the feed device for the number-of-words mechanism in various positions.
Figure 5:
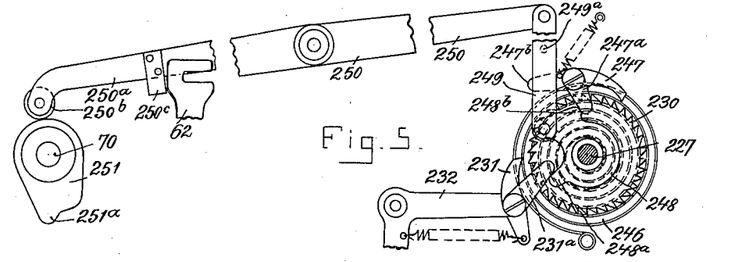

The angle lever 191 is controlled not only by the carriage 2 and the line-separating key 222 but also both by the fixed stop-rail 225 and by the movable stop-rails 223 and 224. These movable stop-rails are formed at one end as toothed racks 223$^a$ and 224$^a$ which are in mesh with two gears 228 and 229 of different diameter and having a different number of teeth. When they rotate they shift the stop-rails 223 and 224 in such manner that the displacement of the stop-rail 223 is proportional to the width of the small auxiliary blanks and that of the stop-rail 224 to the width of the larger auxiliary blanks. The gears 228 and 229 are fast on a common axle 227, on which is secured a ratchet wheel 230 (Fig. 3) with which a pawl 231 (designated in the following as feed pawl) revoluble about a neck-screw on the arm 232 of an angle lever 233, engages. The arm 233 of this lever is under the action of a spring 234 and locked by a catch 235. As soon as the end of the arm 233 is released by this catch the arm can follow the movements of a pin 239 in the eccentric rod 240. The catch 235 forms one arm of an angle lever whose other arm 236 can be moved by a thrust rod 237. The latter is driven by means of a projection 238 on the shaft 86$^b$ connected with the shaft 86 and with the word-separating key 86$^a$. When the lever arm 233 is released, it follows the movement of the pin 239 of the eccentric rod 240 which is driven by an eccentric 241 fast on the main shaft 78 and is formed at its free end as a pawl 242 for moving the ratchet wheel 243 fast on the axle 244 of the paper feed-roll 245 for feeding the perforated strip of paper. If, owing to pressure on the word-separating key 86$^a$, the lever 233 has been released by the catch 235 and placed by the spring 234 against the pin 239, it is now returned by the eccentric rod 240 because the main shaft is simultaneously coupled with the source of power by means of coupling devices which are described in detail in my above mentioned U. S. Letters Patent 988,984. The ratchet wheel 230 which is prevented from rotating backward by the retaining pawl 247, is consequently fed one tooth by the pawl 231, and this movement is repeated whenever the word-separating key is struck and the stop-rails 223 and 224 are simultaneously correctly adjusted.

Before a new line is begun the stop-rails 223 and 224 must be returned into their initial or line-beginning positions. To this end, I provide on the axle 227 a coil spring 246 (Figs. 4 to 7) which tends to rotate the axle 227 and the ratchet wheel 230 into the line beginning position but is usually prevented from so doing by the pawls 231 and 247. Both these pawls must therefore be lifted, after the termination of a line, from the wheel 230. To this end, as shown in Figs. 3 to 7, a small lever-arm 231ª is firmly connected with the feed-pawl 231 and a small lever-arm 247ª with the retaining pawl 247. A cam 248 having two projections 248ª and 248ᵇ is free to rotate near the ratchet wheel 231 on the axle 227, and is pivotally connected by the rod 249 with the two-armed lever 250 carrying on its arm 250ª an anti-friction roller 250ᵇ which coacts with another cam 251. The latter is fast on the auxiliary shaft 70 of the machine and rotates one revolution as soon as the appertaining clutch is engaged which is the case whenever the word-canceling key, the line-separating key and the line-canceling key are actuated. Owing to the lever 250 being under the action of a spring 252 the antifriction roller 250ᵇ follows the periphery of the rotating cam 251, and the lever 250 therefore rocks the cam 248 and its projections 248ª and 248ᵇ which coact with the lever arms 231ª and 247ª and lift the pawls 231 and 247 out of the teeth of the wheel 230 as particularly shown in Fig. 5. This wheel is now returned by the spring 246 into its initial position and by means of the gears 228 and 229 simultaneously returns the stop-rails 223 and 224 into their corresponding positions.

Figure 6:
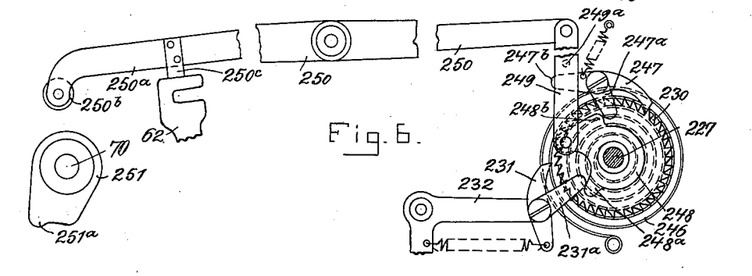
Figure 7:
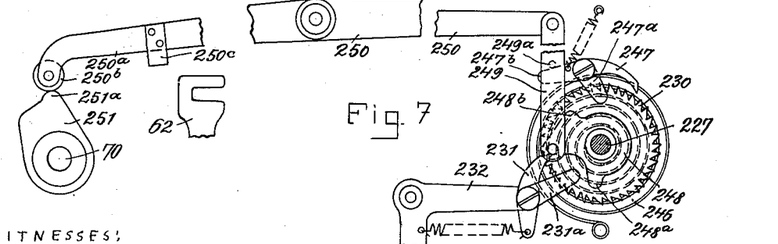

As, when eliminating a word, the symbol for the wedge-shaped justifier perforated in front of the word must also be simultaneously made inoperative, the stop-rails 223 and 224 must be placed back corresponding amounts, to which end it is necessary to turn the wheel 230 backward one tooth. This is likewise brought about by the lever-arm 250 and the cam 251 which lifts the two pawls 231 and 247 in succession out of the teeth of the wheel 230, so that they operate like an escapement. To this end, I provide not only a second lever-arm 247ᵇ on the pawl 247, but also a pin 249ª on the rod 249. The cam 251 has a projection 251ª and the lever-arm 250ª is provided with a lug 250ᶜ. A lever 62 is operatively connected by a slotted link 68ᵇ to the lever arm 68ᶜ on the shaft 68 of the word-canceling key 68ª. When this key is depressed the lever 62 is thrown into the position shown in dotted lines in Fig. 3. The end of this lever is thereby located under the lug 250ᶜ and supports the lever arm 250ª during the rotation of the cam 251 in such manner that the lever arm 250ª can only move a small distance owing to the action of the spring 252. The cam 248 is hereby rotated so much that its projection 248ª lifts the pawl 231 out of the ratchet wheel 230 as shown in Fig. 6. The projection 248ᵇ does not, however, reach the lever-arm 247ª and the retaining pawl 247 remains in engagement with the ratchet wheel 230 but allows it to move backward a little under the action of the spring 246. When the cam 251 rotates farther the lever 250ª is raised again and the projection 248ª releases the pawl 231. In consequence of the rearward movement of the ratchet wheel 230 this pawl now falls upon the next tooth. The lever-arm 250ª is raised still farther by the projection 251ª and the rod 249 moves downward rather below its rest position (see Fig. 7). The pin 249ª coacts with the lever-arm 249ᵇ and the pawl 247 releases the ratchet wheel 230. This can now rotate backward again a small distance until it is stopped by the pawl 231. The lever 62 is locked after the depression of the word-canceling key and until the lever 250 is operated in the position shown in dotted lines in Fig. 3 by a pawl 250ᵉ. The lever 62 is released by the lever 250 which presses upon the arm 250ᵈ of the pawl 250ᵉ. It is necessary to lock the lever 62 because the rotation of the cam 251 only begins after the word-canceling key 68ª has been released. Consequently, whenever the word-canceling key is depressed the ratchet wheel 230 is moved backward in this manner one tooth and the feed of the stop-rails 223 and 224 is simultaneously thereby reduced the corresponding amount.

Justification-bars 226ª, 226ᵇ and 226ᶜ are so arranged under the stop-rails 223 to 224 that when the lever-arm 191 descends it meets with one of these justification-bars and according as it rests against the stop-rail 223, 224 or 225 in each case it acts either on the bar 226ª or on the bar 226ᵇ or on the bar 226ᶜ. Each of these justification-bars has its upper part formed in such manner that it can be depressed by the lever-arm 191 whatever the position of the slide 195 may be. The justification-bars 226ª and 226ᵇ are connected like the word-canceling key 68ª with the perforating apparatus. They coact with shafts 253ª, 253ᵇ and 253ᶜ which are provided with ribs and can each displace two universal bars 103. When the justification-bars 226ª, 226ᵇ are depressed the said universal bars each release two punches which punch the symbol requisite for the selection of the auxiliary blank and, in addition, cause the line-separating symbol to be perforated.

The universal bar 226ᶜ is for perforating the latter only. To this end, the shafts 253ª, 253ᵇ and 253ᶜ carry at the rear of the apparatus small lever-arms 254ª, 254ᵇ and 254ᶜ engaging with lever-arms 186ª, 186ᵇ and 186ᶜ. These latter lever-arms are firmly connected with the pawl 178. By depressing one of the justification-bars 226ª, 226ᵇ or 226ᶜ the clutch of the main shaft of the machine is first engaged. In the case of the bars 226ª and 226ᵇ this is brought about by the universal bars 103 as described in detail in my above-mentioned United States Letters Patent No. 988,984. As the justification-bar 226ᶜ does not move any universal bar, I provide on its shaft 253ᶜ a small lever-arm 253ᵈ which engages a link 255, pivoted to the lever 166, and, when the bar 226ᶜ is depressed, brings about the engagement of the clutch of the said shaft. The lever 180 is simultaneously released by the catch 178 and the auxiliary shaft 70 is coupled with the driving source of power. A cam 256 having a recess 256ᵃ is provided on the auxiliary shaft 70, and an antifriction roller 257ᵃ carried on a rod 257 coacts with this cam. The upper end of this rod is carried by one end of a lever 258 which rocks about a neck-screw 258ᵃ, its other end 258ᵇ being attached to a spring 259 which places the said roller on the rod against the cam 256. The bottom end of the rod 257 is connected by means of a small lever-arm 260ᵃ with the shaft 260 which acts on the universal bars similarly to the shafts corresponding to the character keys and brings about the release of the punches for perforating the line-separating symbol. Whenever the justification-bars 226ᵃ and 226ᵇ are depressed a perforated symbol for an auxiliary blank is first punched, the auxiliary shaft 70 being simultaneously thrown into gear and rotating the cam 256 on it; then, as soon as the recess 256ᵃ arrives over the roller 257ᵃ, the rod 257 rises under the action of the spring 259 and by means of the shaft 260 brings about the displacement of two universal bars 103 and thereby the perforation of the line-separating symbol. In like manner the bar 226ᶜ brings about the perforation of the line-separating symbol without previously punching another combination of holes, as it causes the engagement of the main clutch, as described above, by means of the lever 253ᵈ, link 255, etc., and the engagement of the clutch of the auxiliary shaft by means of the levers 254ᶜ, 186ᶜ, etc. When the word-canceling key 68ᵃ is actuated the auxiliary shaft 70 is likewise rotated but no line-separating symbol may be punched. The shaft 260 therefore carries an additional lever-arm 261 (Fig. 3) which is held in its rest position by the lever-arm 62ᵃ, firmly connected or integral with the lever 62, as soon as the latter is actuated by the word-canceling key. Consequently, the shaft 260 and the rod 257 cannot follow the action of the spring 259 when the roller 257ᵃ is released by the cam 256.

My improved justifying mechanism operates as follows:—Whenever a character key is depressed the paper carriage is fed an amount proportional to the breadth of the character set by the depression of the key. If the line is set up full without wedge-shaped justifiers, it may not be extended beyond the minimum length of line in the perforating machine, because in this event the minimum length of line in the perforating machine agrees with the standard length of line in the type-setting machine. The paper carriage then has at the end of a line such a position that its stop 210 rests against the slide 195 without, however, shifting the latter. Likewise, in this event the stop-rails 223 and 224 remain in their rest positions and when the line-separating key 222 is actuated the lever-arm 191 rests against the stop bar 225 and depresses the justification-bar 226ᶜ, which occasions the punching of the line-separating symbol, farther down. Consequently, in this case no auxiliary-blank symbol is perforated. If the word-separating key is actuated when composing, at each pressure on this key the paper carriage is fed the amount which is proportional to the largest width of justification of the wedge-shaped justifier plus the largest width of the auxiliary blank employed. In this event the paper carriage reaches the end point of the minimum length at the moment when the line has attained such a length that it can be brought with the greatest width of the wedge-shaped justifiers and the addition of the greatest width of the auxiliary blanks to the standard length of line in the type-setting machine. Whenever the word-separating key is depressed the stop-rails 223 and 224 are simultaneously shifted the above-mentioned amounts. Now when, after the line has attained the minimum length and the slide 195 is still in its rest position, the line-separating key is actuated, the lever-arm 191 lies against the stop-rail 223 and presses the justification-bar 226ᵃ, which brings about the punching of the perforated symbol for the auxiliary blank of the greatest width and consequently the line is set up, as intended, with the greatest width of justification. If the line is set up beyond the minimum length an amount no longer admitting of either the employment of auxiliary blanks of the greatest width, or of complete justification of the line with the wedge-shaped justifiers alone, in this event the slide 195 and with it the lever 191 is shifted so much that when the line-separating key is actuated this lever is no longer pressed against the stop-rail 223, but abuts against the stop-rail 224 and the key 226ᵇ is pressed. A perforated symbol is then punched which brings about the setting of an auxiliary blank of small width and thereby enables the line to be correctly justified. If the line is set up so full that it can be justified by the existing wedge-shaped justifiers alone, the slide or the lever 191 has reached such a position that it abuts against the fixed stop-rail 225 and only the line-separating symbol is perforated. In the last example no symbol for an auxiliary blank is perforated.

Figure 12:
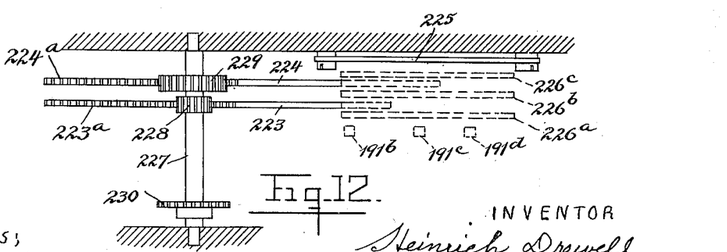

In Fig. 12 one case of adjustment of the stop-rails 223 and 224 and three different positions of the bottom end of the lever 191 are shown in dotted lines. The position of the lever 191 shown at 191ᵇ corresponds to the first, the position shown at 191ᶜ to the second, and the position shown at 191ᵇ to the third of the three cases before mentioned.

Figure 11:
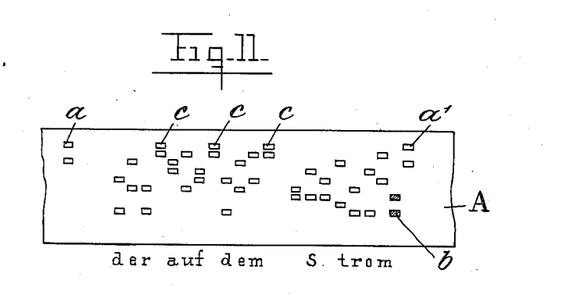
Fig. 11 shows a portion of a perforated band.

As seen in Fig. 11, each line when perforated on the band A is placed between two line-separating symbols $a$ and $a^1$ which serve to separate this line from the foregoing and following ones. Before the line-separating symbols $a$, the justification symbol $b$ has been perforated and this will cause an auxiliary blank to be set up besides the ordinary word-separating blank each time when one of the word-separating symbols $c$ actuates the type-setting machine.

Without departing from the scope of my invention the feed of the paper carriage may be so modified that it is proportional, when a word-separating element is being set, to the smallest width of such element. In this event the stop-rails 223 and 224 must be moved in a direction opposite to that of the paper carriage.

The hereinbefore described mechanism can also be employed, without material alteration, for those type-setting machines in which justification is brought about by means of compressible justifiers.

If when employing expansible or compressible justifiers the shortage is indicated in the perforating machine by an amount a little less than can be removed by the justifiers without impairing the certainty of justifying, types which only approximately agree in size with the elements of the matter can be employed for the matter.

I claim:—

1. In means for making operating bands of the character described, the combination of a perforating device for perforating a band, a plurality of character controlling keys for operating said perforating device, an indicating member for indicating the length of lines of characters perforated in the band, feed mechanism controlled by said keys for feeding said indicating member, a word-separating key, feed means controlled by said word-separating key, a plurality of stop-rails adapted to be moved by said feed means parallel to the movement of said indicating member, a plurality of justification-bars for operating said perforating device and causing various justifying perforations to be made in said band, a selecting lever adjusted by said indicating member and adapted to select one of said justification-bars, and means for actuating said selecting lever and moving it against said stop-rails and said justification-bars in succession for actuating one of said justification-bars.

2. In means for making operating bands of the character described, the combination of a perforating device for perforating a band, a plurality of character controlling keys for operating said perforating device, an indicating member for indicating the length of lines of characters perforated in the band, feed mechanism controlled by said keys for feeding said indicating member, a word-separating key, a feed shaft carrying a ratchet wheel, rotatory means controlled by said word-separating key for rotating said ratchet wheel stepwise, a plurality of gear wheels on said feed shaft, a plurality of stop-rails formed as racks and meshing with said gear wheels adapted to be moved thereby in the direction of the movement of said indicating member, a plurality of justification-bars for operating said perforating device and causing various justifying perforations to be made in said band, a selecting lever adjusted by said indicating member and adapted to select one of said justification-bars, and means for actuating said selecting lever and moving it against said stop-rails and said justification-bars in succession for actuating one of said justification-bars.

3. In means for making operating bands of the character described, the combination of a perforating device for perforating a band, a plurality of character controlling keys for operating said perforating device, an indicating member for indicating the length of lines of characters perforated in the band, feed mechanism controlled by said keys for feeding said indicating member, a word-separating key, feed means controlled by said word-separating key, a plurality of stop-rails adapted to be moved by said feed means parallel to the movement of said indicating member, a plurality of justification-bars for operating said perforating device and causing various justifying perforations to be made in said band, a selecting lever adjusted by said indicating member and adapted to select one of said justification-bars, means adapted to adjust said selecting lever and adapted to be actuated by said indicating member, means for actuating said selecting lever and moving it against said stop-rails and said justification bars in succession for actuating one of said justification-bars, a word-canceling key, means for retracting said stop-rails stepwise, and means actuated by said word-canceling key, for controlling the latter means.

4. In means for making operating bands of the character described, the combination of a perforating device for perforating a band, a plurality of character controlling keys for operating said perforating device, an indicating member for indicating the length of lines of characters perforated in the band, a word-separating key, a feed shaft carrying a ratchet wheel, a spring attached to said feed shaft tending to move the same into its initial position, rotatory means comprising a feed pawl controlled by said word-separating key, said feed pawl engaging and adapted to feed said ratchet wheel against the tension of said spring, a retaining pawl normally retaining said ratchet wheel from backward movement, disengaging means for disengaging said retaining pawl and said feed pawl from said ratchet wheel in succession and thereby allowing said spring to turn said ratchet wheel backwardly one step, a word-canceling key controlling said disengaging means, a plurality of gear wheels on said feed shaft, a plurality of racks meshing with said gear wheels and forming stop-rails adapted to be moved in the direction of the movement of said indicating member, a plurality of justification-bars for operating said perforating device and causing various justifying perforations to be made in said band, a selecting lever adjusted by said indicating member and adapted to select one of said justification-bars, and means for actuating said selecting lever and moving it against said stop-rails and said justification-bars in succession for actuating one of said justification-bars.

5. In means for making operating bands of the character described, the combination of a perforating device for perforating a band, a plurality of justification means for operating said perforating device and each adapted to cause a justifying symbol to be perforated in the band, automatic selecting means for selecting and actuating one of said justification means, indicating means for indicating the length of a line of characters perforated in the band, returning means for returning said automatic selecting means and said indicating means to their initial positions, and means controlled by said justification means for controlling said returning means.

6. In means for making operating bands of the character described, the combination of a perforating device for perforating a band, a plurality of justification means for operating the perforating device and each adapted to cause a justifying symbol to be perforated in the band, selecting means for automatically selecting and actuating one of said justification means, indicating means for indicating the length of a line of characters perforated in the band, line-separating means for actuating said perforating means and perforating a line-separating symbol and for simultaneously returning said selecting means and said indicating means to their initial positions, and means controlled by said justification means for controlling said line-separating means.

In testimony whereof I have signed my name to this specification in the presence of two subscribing witnesses.

HEINRICH DREWELL.

Witnesses:
HENRY HASPER,
WOLDEMAR HAUPT.